United States Patent Office 3,300,301
Patented Jan. 24, 1967

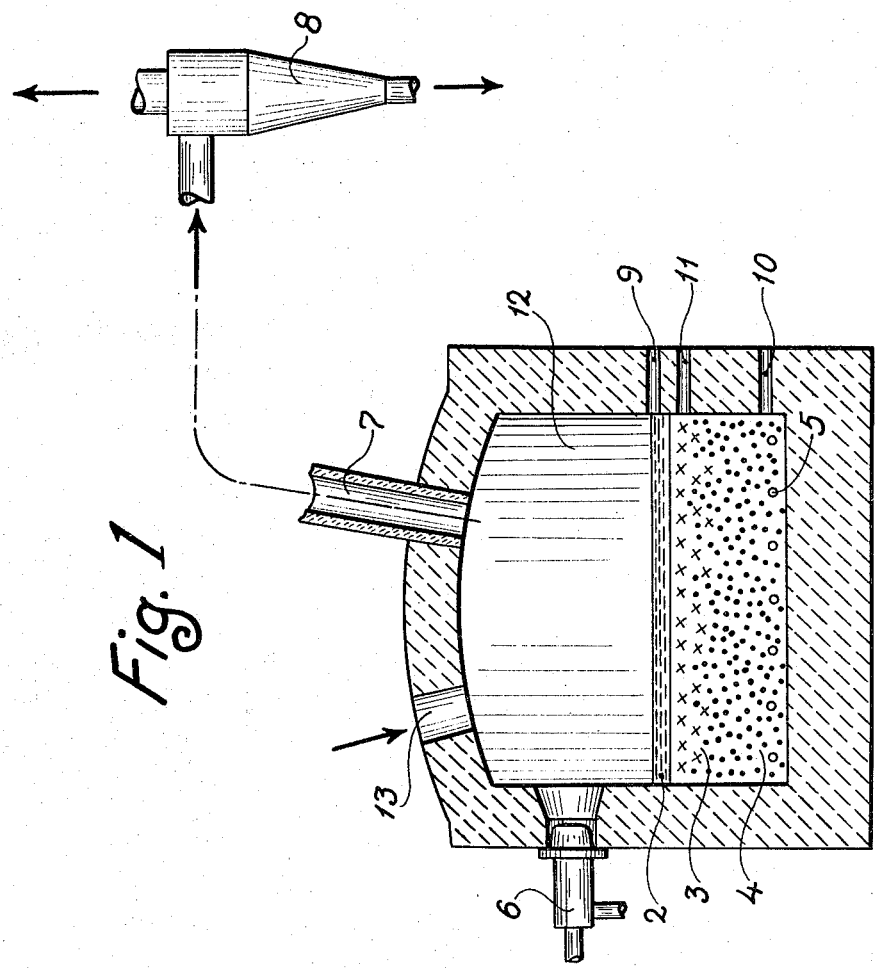

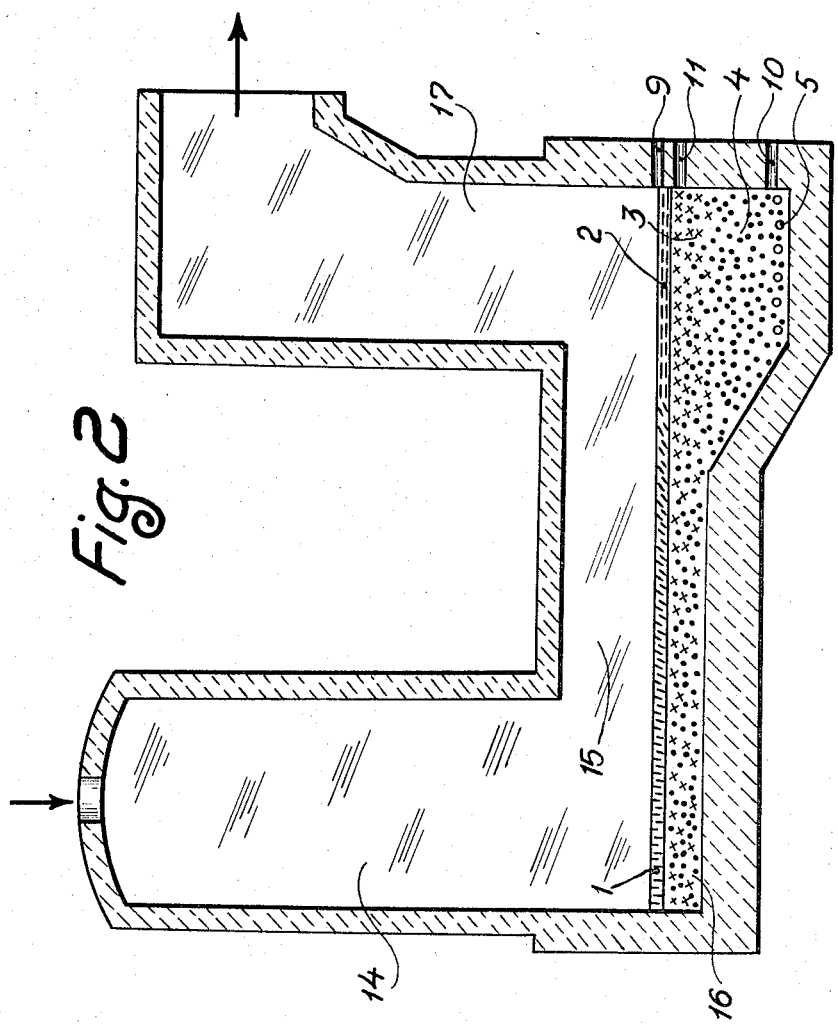

3,300,301
PROCESS FOR THE PRODUCTION OF METALLIC LEAD FROM MATERIALS CONTAINING LEAD OXIDE
Rolf Einar Malmström, Pori, Finland, assignor to Outokumpu Osakeyhtio, Helsinki, Finland, a company of Finland
Filed Dec. 6, 1963, Ser. No. 328,647
Claims priority, application Sweden, Dec. 14, 1962, 13,489/62
6 Claims. (Cl. 75—77)

The following invention consists of a process for the production of metallic lead from materials containing lead oxide. Its object is to simplify the operation and reduce the costs of production.

All prior known lead production processes comprise a large number of laborious operations including the use of coke as a reducing agent to produce pure lead and slag with a low lead content. In the shaft-furnace process, the lead concentrate has to be well desulphurized and agglomerated before smelting and reduction. Roast-reaction processes, such as the Newnam Hearth and Lurgi's (Transaction of AIME, 1962, vol. 224, pp. 939–944) self-fluxing lead smelting methods, produce a lead-rich slag that has to be reduced separately with coke or coal.

The process according to this invention eliminates these disadvantages. Such process comprises establishing a molten charge in a furnace chamber, said molten charge containing molten lead oxide, said molten charge having in the recited order in the direction from the bottom of the furnace chamber upwardly a layer of molten lead, a layer of molten matte overlying the layer of molten lead, said molten matte layer containing sulphides including lead sulphide, and a layer of molten slag containing lead oxide overlying the layer of molten matte, adding sulphur containing material as a reduction agent to the material containing molten lead oxide, reducing the lead in the slag by the sulphides in the matte layer, collecting the thus reduced lead into the matte layer and thence into the metallic lead layer, and separately withdrawing from the furnace chamber slag from the uppermost slag layer and metallic lead from the lowermost metallic lead layer.

The most suitable sulphuric material is naturally lead sulphide, though other lead oxide reducing sulphides can be used. Obviously, too, concentrates of lead sulphide and/or other sulphide concentrates capable of reducing lead oxide can also be used.

In the embodiment of the invention described below, the raw material is slag containing lead oxide, but it goes wtihout saying that other raw materials containing lead oxide are equally applicable. The process according to the invention is based on the reducing effect of lead matte on slags containing lead, as indicated by the following reaction.

$$PbS + 2PbO \rightarrow 3Pb + SO_2$$

To reduce slag with a lead oxide content, the activity of the lead sulphide must be sufficiently high. For lead sulfide to react with slag containing lead oxide at temperatures at which the slag is in a molten state, large excess quantities of sulphide are required, because the reduced lead from the slag dilutes the sulphide and lowers its activity.

By a suitable process, however, the metallic lead can be separated from the matte, basing on the principle that the solubility of the lead-sulphide in metallic lead decreases as the temperature drops, and is minimal near the melting point of the lead. The object of this method is to cool the bottom of the furnace with air or water-cooled pipes, for example, so that the molten lead at the bottom is kept at a temperature slightly over that of its melting point, thus separating the lead-sulphite from the lead and forming a layer of pure matte under the slag, which is reduced to a low lead content. The molten substance at the bottom is metallic lead with a very low sulphur content. The temperature of the slag layer is kept sufficiently high by means of an oil burner, for instance.

The quantity of sulphide required for the reduction is obtained by adding lead-sulphide or some other sulphide concentrate. Thus no separate reducing agent is needed. If it is necessary to raise the iron oxide content of the slag, iron sulphide concentrate can be used to form iron oxide according to the following formula:

$$FeS + 3PbO \rightarrow FeO + 3Pb + SO_2$$

The process according to the invention is described hereunder with reference to the accompanying drawings:

FIG. 1 is a cross section through a furnace according to the invention.

FIG. 2 is a longitudinal section through a "flash-type" furnace used in accordance with the invention.

In FIG. 1, slag with a high lead content is fed, together with the necessary sulphide, into the furnace chamber 12 through an inlet opening 13. In the lead bath 4 in the furnace, there is formed a layer of matte 3 and, above this, a layer of slag 2. The metallic lead is separated from the matte by cooling the bottom of the lead bath with pipes 5. The surface of the slag is kept at the desired temperature by means of an oil burner 6. The exhaust gasses and accompanying dust are removed via an exhaust gas outlet 7 and the dust are separated in a collector 8, from which they are returned to the furnace. The reduced slag and metallic lead obtained are withdrawn through outlets 9 and 10, respectively. If required, matte can be led off through a separate outlet 11.

In FIG. 2, the invention is adapted to the simultaneous smelting of sulphide lead concentrate in a "flash-type" furnace (Finnish Pat. No. 22,694). The lead concentrate is fed together with air for oxidation into the upper part of a reaction shaft 14. On its way down through the shaft, the concentrate is ignited upon which the temperature is raised by the oxidation reaction, so that molten metallic lead and molten slag containing lead oxide are produced. The reaction products are settled, together with the small amount of the matte formed, in a basin 15, where slag 1 containing lead oxide is separated from the lead and matte, forming a mixture of metallic lead and lead matte 16 under the slag. The bottom of the basin at the outlet end forms a trough where the bottom is cooled to a temperature near that of the melting point of lead by means of pipes 5. As the molten substance—i.e. the mixture of slag and lead matte—approaches the outlets 9 and 10, the lead 4, is separated from the lead matte mixture, and pure matte 4 is formed under the slag layer 2, which is thus reduced to a low lead content. The reaction gasses from the furnace rise through a shaft 17 to a cooling and separating device from which the dust is fed back for reprocessing. The quantity of matte can be regulated by altering the ratio of reaction air to concentrate, or by feeding lead concentrate straight into the furnace basin. Matte is tapped separately through outlet 11, if required.

To economize on fuel oil for heating the slag—i.e. to reduce slag cooling to the minimum—the furnace can be designed so that the lead bath remains sufficiently deep. This enables the bottom of the lead bath to be kept at a temperature just over that of the melting point of the lead without excessively cooling the layers of matte and slag above it. It is an advantage to draw the lead off continually via an overflow pipe in order to keep the lead bath depth constant.

If the raw material contains copper and precious metals, most of the former and some of the latter become enriched in the matte. Matte enriched with these products is a valuable material worth further processings, and there should therefore be a means of tapping matte containing these metals from the furnace.

If the invention is combined in any way with a device for smelting lead, the gasses produced by the reduction process and the accompanying dust can conveniently be handled together with the smelting furnace gasses in cooling the same and separating devices.

Tests have been made with a furnace designed according to FIG. 1. The bath was 500 mm. deep and had a surface of 0.7 sq. metres. Heating was provided direct by butane gas, keeping the bath surface at a temperature of 1250° C. The bottom of the molten bath was cooled by aircooled pipes to a temperature of about 500° C.

*Example 1*

The furnace was charged with metallic lead containing sulphur and 100 kg. of a lead oxide containing slag to a depth of 400 mm. When the slag and matte separated from the lead were in equilibrium, the slag contained 13.5% lead, and the lead from the bottom of the bath contained 0.05% sulphur. After the addition of 10 kg. of lead concentrate containing 71% lead sulphide, the lead content of the slag fell to 5.6% within 15 minutes, and then 15 minutes after addition of a further 10 kg. of concentrate, it fell to 2.1%. At this point the metallic lead contained 0.04% of sulphur. Finally, an excess of 50 kg. of lead concentrate was added, and then the slag in equilibrium contained 1.7% lead and the lead 0.06% sulphur.

*Example 2*

To ascertain whether the layer of matte under the slag layer can reduce lead oxide without the addition of sulphide to the slag from above, the following experiment was carried out: to the molten substance obtained in Example 1, which contained an excess of lead sulphide, was added 30 kg. of red lead ($Pb_3O_4$) which should have raised the lead content of the slag to over 20%. After 20 minutes, however, the slag only contained 2.3% lead and, after a further 20 minutes, 2.0%. During the whole time, the sulphur content in the metallic lead was 0.06%.

Naturally, by using a deeper lead bath in the above tests, the bottom could have been kept at a lower temperature, thus reducing the sulphur content in the lead.

What I claim is:

1. A process for the production of metallic lead from materials containing lead oxide, comprising establishing a molten charge in a furnace chamber, said molten charge containing molten lead oxide, said molten charge having in the recited order in the direction from the bottom of the furnace chamber upwardly a first layer of molten lead, a second layer of molten matte overlying the layer of molten lead, said molten matte layer containing sulphides including lead sulphide, and a third layer of molten slag containing lead oxide overlying the layer of molten matte, adding sulphur containing material as a reduction agent to the second, matte layer through the third layer of molten slag, reducing the lead oxide in the slag by the sulphides in the matte layer, collecting the thus reduced lead into the matte layer and thence into the metallic lead layer, maintaining a temperature gradient in the molten charge from its surface toward its bottom so that the bottom part of the charge is kept cooler than the surface of the molten charge, and separately withdrawing from the furnace chamber slag from the third, slag layer and metallic lead from the cooler first, metallic lead layer.

2. A process according to claim 1, comprising applying heat to the top of the charge in the furnace chamber to maintain said charge in molten condition.

3. A process for the production of metallic lead from materials containing lead oxide, comprising establishing a molten charge in a furnace chamber, said molten charge containing molten lead oxide, said molten charge having in the recited order in the direction from the bottom of the furnace chamber upwardly, a first layer of molten lead, a second layer of molten matte overlying the layer of molten lead, said molten matte layer containing sulphides including lead sulphide, and a third layer of molten slag containing lead oxide overlying the layer of molten matte, adding sulphur containing material as a reduction agent to the second, matte layer, reducing the lead oxide in the slag by the sulphides in the matte layer, collecting the thus reduced lead into the matte layer and thence into the metallic lead layer, cooling the layer of molten metallic lead to maintain such layer somewhat above but near its melting point, and separately withdrawing from the finished chamber slag from the uppermost, slag layer and metallic lead from the cooler lowermost, metallic lead layer.

4. A process according to claim 3, wherein the cooling of the molten lead layer is achieved by means of pipes carrying a cooling medium, said pipes being in contact with the layer of molten lead.

5. A process according to claim 4, comprising cooling the layer of molten metallic lead adjacent the bottom thereof to maintain such layer somewhat above but near its melting point.

6. A process for the production of metallic lead from materials containing lead oxide, comprising establishing a molten charge in a furnace chamber, said molten charge containing molten lead oxide, said molten charge having in the recited order in the direction from the bottom of the furnace chamber upwardly a first layer of molten lead, a second layer of molten matte overlying the layer of molten lead, said molten matte layer containing sulphides including lead sulphide, and a third layer of molten slag containing lead oxide overlying the layer of molten matte, adding sulphur containing material as a reduction agent to the second, matte layer through the third layer of molten slag, reducing the lead in the slag by the sulphides in the matter layer, collecting the thus reduced lead into the matte layer and thence into the metallic lead layer, cooling the layer of molten metallic lead to maintain such layer somewhat above but near its melting point, and separately withdrawing from the furnace chamber slag from the third, slag layer and metallic lead from the first, metallic lead layer.

References Cited by the Examiner

UNITED STATES PATENTS

| | | | |
|---|---|---|---|
| 543,753 | 7/1895 | Roux | 75—77 |
| 882,193 | 3/1908 | Francis | 75—77 |
| 1,687,187 | 10/1928 | Williams. | |
| 2,416,628 | 2/1947 | Kalling et al. | 75—77 |
| 2,660,525 | 11/1953 | Foster | 75—77 |
| 2,769,706 | 11/1956 | Herneryd et al. | 75—77 |
| 2,797,158 | 6/1957 | Wendeborn et al. | 75—77 |
| 2,984,562 | 5/1961 | Kohlmeyer | 75—77 |

DAVID L. RECK, *Primary Examiner.*

H. W. TARRING, *Assistant Examiner.*